(12) United States Patent
Beyer et al.

(10) Patent No.: US 7,293,403 B2
(45) Date of Patent: Nov. 13, 2007

(54) COMBUSTION CHAMBER WITH INTERNAL JACKET MADE OF A CERAMIC COMPOSITE MATERIAL AND PROCESS FOR MANUFACTURE

(75) Inventors: Steffen Beyer, Munich (DE); Helmut Knabe, Friedrichshafen (DE); Dieter Preclik, Munich (DE)

(73) Assignee: Astrium GmbH, Munich (DE)

( * ) Notice: Subject to any disclaimer, the term of this patent is extended or adjusted under 35 U.S.C. 154(b) by 84 days.

(21) Appl. No.: 10/717,614

(22) Filed: Nov. 21, 2003

(65) Prior Publication Data

US 2004/0128979 A1   Jul. 8, 2004

Related U.S. Application Data

(63) Continuation of application No. 10/159,276, filed on Jun. 3, 2002, now Pat. No. 6,890,660.

(30) Foreign Application Priority Data

Jun. 1, 2001   (DE) ................. 101 26 926

(51) Int. Cl.
*F02K 11/00* (2006.01)
(52) U.S. Cl. ............. 60/266; 60/267; 239/127.3
(58) Field of Classification Search ........... 264/29.1, 264/162, 219, 317, 258; 427/228, 251; 60/272, 282, 257, 267, 266; 205/150, 160, 205/161; 239/127.3
See application file for complete search history.

(56) References Cited

U.S. PATENT DOCUMENTS

| | | | |
|---|---|---|---|
| 3,550,247 A * | 12/1970 | Evans et al. ............... 29/419.1 |
| 4,063,684 A | 12/1977 | O'Brien et al. | |
| 4,817,890 A * | 4/1989 | Coffinberry ............. 244/135 R |
| 4,967,599 A * | 11/1990 | Donguy ...................... 60/271 |
| 4,999,240 A * | 3/1991 | Brotz ......................... 442/376 |
| 5,147,368 A * | 9/1992 | Brown ........................ 606/107 |
| 5,434,023 A * | 7/1995 | Teraoka et al. ............. 429/223 |
| 5,451,448 A | 9/1995 | Sawko et al. | |
| 5,643,684 A * | 7/1997 | Tsubouchi et al. .......... 428/605 |
| 5,842,342 A * | 12/1998 | Strasser et al. ............... 60/282 |
| 5,855,828 A * | 1/1999 | Tuffias et al. .............. 264/29.1 |
| 5,899,060 A * | 5/1999 | Schmidt ...................... 60/267 |
| 5,964,273 A * | 10/1999 | Strasser et al. ............... 164/98 |
| 6,134,881 A * | 10/2000 | Strasser et al. ............... 60/272 |
| 6,146,714 A * | 11/2000 | Beyer et al. ................. 427/554 |
| 6,151,887 A * | 11/2000 | Haidn et al. .................. 60/257 |
| 6,182,442 B1 * | 2/2001 | Schmidt et al. ............... 60/267 |
| 6,197,411 B1 | 3/2001 | Billaud et al. | |
| 6,202,405 B1 * | 3/2001 | Beyer et al. .................. 60/267 |
| 6,254,975 B1 * | 7/2001 | Kayser et al. ........... 428/293.4 |
| 6,640,538 B1 * | 11/2003 | Preclik et al. ................ 60/266 |

(Continued)

FOREIGN PATENT DOCUMENTS

DE   37 34 100   4/1988

(Continued)

*Primary Examiner*—N Edwards
(74) *Attorney, Agent, or Firm*—Crowell & Moring LLP

(57) ABSTRACT

A combustion chamber, in particular for a rocket drive, includes at least one jacket madeof a composite material with a ceramic matrix. The composite material contains a fibrous structure made of carbon-containing fibers, and the fibrous structure comprises layers of fibers that form a three-dimensional matrix.

16 Claims, 3 Drawing Sheets

U.S. PATENT DOCUMENTS 6,890,660 B2 * 5/2005 Beyer et al. ................. 428/446
7,118,802 B2 * 10/2006 Simon et al. ............ 428/293.4

FOREIGN PATENT DOCUMENTS

| | | |
|---|---|---|
| DE | 197 30 674 | 1/1999 |
| DE | 198 58 197 | 6/2000 |
| EP | 0249393 | 12/1987 |
| EP | 1013412 | 6/2000 |

* cited by examiner

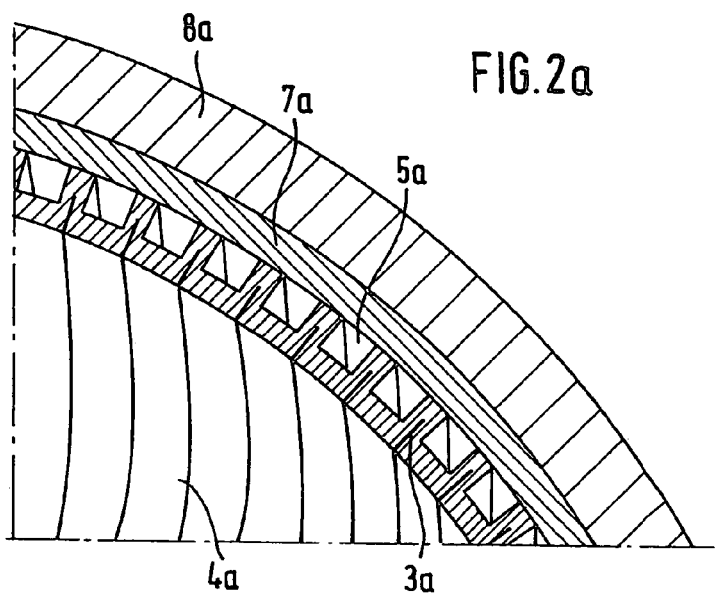
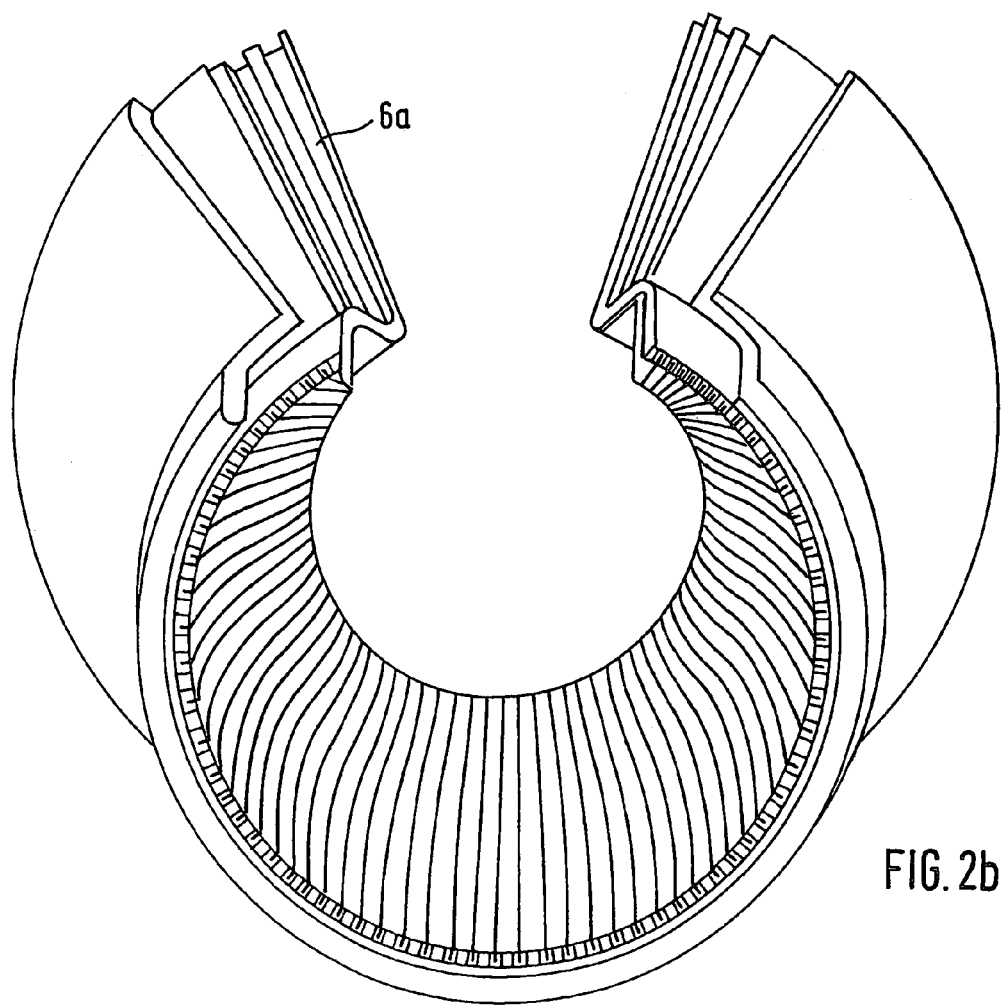

COMBUSTION CHAMBER WITH INTERNAL JACKET MADE OF A CERAMIC COMPOSITE MATERIAL AND PROCESS FOR MANUFACTURE

This application is a division of application Ser. No. 10/159,276, filed Jun. 03, 2002 now U.S. Pat. No. 6,890,660.

BACKGROUND AND SUMMARY OF THE INVENTION

This application claims the priority of German Patent Document DE 101 26 926.9, filed on Jun. 1, 2001, the disclosure of which is expressly incorporated by reference herein.

This invention relates to a combustion chamber, in particular for a rocket drive, exhibiting at least one jacket made of a composite material with a ceramic matrix, wherein the composite material contains a fibrous structure made of carbon-containing fibers, as well as a process for manufacturing a combustion chamber, in particular for a rocket drive, wherein at least one jacket is made of a composite material with a ceramic matrix, wherein the composite material is made on the basis of a fibrous structure made of carbon-containing fibers and wherein silicon is fed to the fibrous structure in order to form a silicon carbide matrix. The invention is applicable, in principle, not only to the special application of rocket drive, engineering but also to other fields, such as aircraft engineering, and, in principle, also to other combustion chambers and furnaces.

The prior art discloses combustion chambers, in particular for rocket drives, where composite materials with a ceramic matrix are used. The disclosure of DE 198 58 197 describes a drive with a combustion chamber, provided with an internal jacket and insulation made of carbon fiber-reinforced silicon carbide (C/SiC). DE 197 30 674 discloses a combustion chamber, in particular for a rocket drive, provided with an internal jacket made of a fiber-reinforced ceramic material or graphite and an external jacket made of a fiber-reinforced ceramic material. DE 37 34 100 describes a combustion chamber for an aircraft, wherein a porous, woven internal wall made of silicon carbide fibers and a woven external wall made of silicon carbide fibers are provided.

A significant problem with the prior art construction method of the combustion chambers with at least one jacket made of a composite material with a ceramic matrix is that, for the ceramic matrix composites (CMC) materials or comparable composite materials used at that time, two-dimensional (2D) structures, in particular 2D C/SiC or 2D carbon fiber reinforced carbon (C/C), are used. These structures exhibit only negligible interlaminar shear strength (ILS) in relation to the shear forces, as can be the case especially in the thrust direction of a rocket drive. For example, U.S. Pat. No. 6,197,411 describes such two-dimensional structures for composite materials with a metal matrix. The stress conditions that can occur in the combustion chamber and that are induced by corresponding thermal loads can result in delamination between individual layers of the CMC structures, a factor that can impair the operability of the combustion chamber and can result in the failure of the combustion chamber.

For special applications of the rocket drives, mechanical stresses such as vibration, bending strain, acoustical loads, that can occur especially at launch time, must be taken into account. To this end, it is necessary that the structure of the drive exhibit adequate ability to absorb any loads and at the same time demonstrate adequate elastic deformation or ductility. The ceramic external structures, known from the prior art, do in fact exhibit high rigidity, but also poor expansion and deformation properties. In addition, the external structure must be gas-tight. The manufacture of gas-tight fiber-reinforced composite ceramics, for example, C/SiC or C/C, can be realized only at a very high cost according to the prior art methods.

Therefore, one object of the present invention is to provide a combustion chamber and a method for manufacturing a combustion chamber, in particular for a rocket drive, which overcome the drawbacks of the prior art.

According to one embodiment, the invention comprises a combustion chamber, in particular for a rocket drive, exhibiting at least one jacket made of a composite material with a ceramic matrix, wherein the composite material contains a fibrous structure made of carbon-containing fibers. In addition to applications in rocket drive engineering, such a combustion chamber can be used for combustion chambers of aircraft technology or other combustion chambers or furnaces. According to the invention, the fibrous structure consists of layers of fibers, forming a three-dimensional matrix. Thus, there is no longer a two-dimensional configuration of the individual fibers or the layers of fibers, but rather the fibers or the layers of fibers are arranged in a defined way in the form of a three-dimensional matrix. In this respect, the fibers or layers of fibers are suitably interconnected in order to guarantee a defined matrix structure. Such a structure significantly improves the stability of the composite material with respect to shear stresses. In addition, the goal with such a defined three-dimensional configuration of fibers is to improve and optimize the adjustability of the thermal conductivity of the composite material.

In particular, it can be provided that the fibrous structure be constructed from first, second and third layers of fibers, wherein the fibers of the first layers extend in a first direction in space; the fibers of the second layers extend in a second direction in space; and the fibers of the third layers extend in a third direction in space; and wherein the individual layers penetrate each other at least partially. Thus, the individual layers can comprise, for example, fibers or bundles of fibers that are arranged parallel to each other, wherein the fibers or bundles of fibers of each layer are separated from each other so that fibers or bundles of fibers of another layer, extending in another direction in space, can be disposed in the resulting spaces. This feature offers the possibility of mutual interpenetration of the individual layers.

Furthermore, it can be provided that the individual layers of the fibrous structure be interconnected by means of textile technology. For example, the individual layers can be interwoven or sewn together. This feature represents a simple and effective way to interconnect individual layers of fibers or bundles of fibers.

In the case of previous combustion chambers, it was provided that silicon carbide fibers be used. However, they have a drawback because they remain stable only up to temperatures of approximately 1,200° C. For higher temperature ranges, for example at 1,500° C. or above, as can occur in a rocket drive, such fibers are inappropriate or they are appropriate only with the provision of additional protective measures. Therefore, for applications at higher operating temperatures exceeding 1,500° C., the fibrous structure made of carbon fibers is preferred.

A composite material that contains silicon carbide can be provided as a special composite material. This silicon carbide can also be formed, at least to some degree, through a reaction of silicon with the fibrous structure.

For applications of the combustion chamber under high loads, as particularly in a rocket drive, or in a correspondingly low load-bearing structure of the jacket made of composite material, it is provided that the jacket made of composite material be enveloped by a load-bearing external jacket. This external jacket serves to support the composite material jacket, which then forms a corresponding internal jacket. To achieve adequate flexibility precisely for applications in a rocket drive, said external jacket is made preferably of a metal material, such as nickel, copper, or a nickel- and/or copper-based alloy, or a suitable steel.

If, as a function of the chosen type of materials and structures of the internal jacket made of composite material and of the external jacket, the result is that these two jackets have a significantly different thermal expansion coefficient, then an intermediate layer, whose thermal expansion coefficient is between that of the external jacket and that of the composite material jacket, can be provided to prevent stresses or even cracks between the external jacket and the composite material jacket. For example, a composite material with a metal matrix can be provided as the intermediate layer, but any other suitable material can also be provided. The intermediate layer of metal-matrix composite material can be affixed on the composite material jacket. To achieve a balance between the thermal expansion coefficients that is as simple and effective as possible, it is preferably provided that the metal matrix contains the same metal material as the external jacket. The external jacket can be affixed on the intermediate layer.

The invention also comprises a process for manufacturing a combustion chamber, in particular for a rocket drive, wherein at least one jacket is made of a composite material with a ceramic matrix, wherein the composite material is based on a fibrous structure made of carbon-containing fibers, and wherein the silicon is fed to the fibrous structure for the purpose of forming a silicon carbide matrix. The invention provides that the fibrous structure be produced as a three-dimensional matrix comprising layers of fibers. Thus, the aforementioned advantages of increased stability, with respect to the shear stresses, and better adjustability of the thermal conductivity, are achieved in a simple and defined manner.

Channel-shaped cooling structures can be provided in the area of the fibrous structure. These cooling structures can be produced in many ways. The layers of the fibrous structure can be arranged in such a manner that channel-shaped spaces remain on the surface of the fibrous structure and/or in the fibrous structure. In this way, the cooling structures are already defined by way of the fibrous structure itself, a feature that has the advantage that the fibers are not destroyed by subsequent treatment steps. It can also be provided that channel structures be not worked into the surface of the composite material by way of mechanical treatment operations until after the composite material has been fabricated. This manufacturing method is relatively simple to carry out. However, channel-shaped contracting bodies, which decompose or dissolve in the course of manufacturing the composite material or thereafter and open the corresponding channels in the composite material, can also be placed, for example, in the fibrous structure within the framework of manufacturing the fiber matrix.

An additional seal and load-bearing reinforcement of the channel structures can be produced in that at least those surface areas of the composite material that exhibit the channel structures are coated with a metal material. Metal-lined channel structures are then produced that better fulfill the requirements imposed on the coolant, flowing through the channels, at least for specific areas of application.

If channel structures are provided on the fibrous structure and other structures are supposed to be produced on this fibrous structure, then it can be provided that channel-shaped contracting bodies be disposed on the surface of the fibrous structure, precisely in the channel structures present there. Then they can be decomposed or dissolved, as described above, in the course of manufacturing the composite material or thereafter and open the corresponding channels in the composite material.

For applications in rocket drives, a load-bearing external jacket can be affixed on the jacket made of composite material. For the aforementioned reasons, it can be provided that an external jacket made of a metal material be affixed. Such an external jacket can be affixed by way of electroplating, soldering, welding techniques, or other known methods.

There are, in principle, various alternatives for composite materials with a metal matrix that can be used for the intermediate layer. Their manufacture is known to some degree. See, for example, U.S. Pat. No. 6,197,411. However, an improved method for manufacturing such a composite material, in particular for forming an intermediate layer between the internal jacket and the external jacket of a combustion chamber, would be an improvement in the art, and such an improvement is provided by the present invention. First, a fibrous structure is affixed on the composite material jacket, and then a metal material is deposited on the fibrous structure with simultaneous infiltration of the fibrous structure with the metal material. Thus, in one working step, a composite material with metal matrix can be produced as the intermediate layer, and an external jacket can be produced on the intermediate layer. The metal material can be deposited in any suitable form, for example, from a liquid or gaseous phase. However, the metal material can also be deposited by way of an electroplating process. In particular nickel or copper or a nickel- and/or copper-containing alloy can be used here as the metal material.

The invention also comprises a process for manufacturing an intermediate layer between an internal jacket and an external jacket of a combustion chamber, in particular a rocket drive, wherein at least one part of the structure is produced from a composite material on the basis of a fibrous structure made of carbon-containing fibers. First, a fibrous structure made of carbon-containing fibers is affixed on the internal jacket, and then a metal material is deposited on the fibrous structure with simultaneous infiltration of the fibrous structure with the metal material. The metal material can be deposited in any suitable form, for example, in a liquid or gas phase. However, the metal material can also be deposited preferably by way of an electroplating process. In particular, nickel or copper or a nickel- and/or copper-containing alloy can be used here as the metal material.

Other objects, advantages and novel features of the present invention will become apparent from the following detailed description of the invention when considered in conjunction with the accompanying drawings.

BRIEF DESCRIPTION OF THE DRAWINGS

FIG. 2a shows a detailed view of the wall structure of a rocket combustion chamber with an intermediate layer and regenerative cooling;

FIG. 2b shows a sectional view of a rocket combustion chamber according to FIG. 2a.

DETAILED DESCRIPTION OF THE DRAWINGS

Figure 1A:
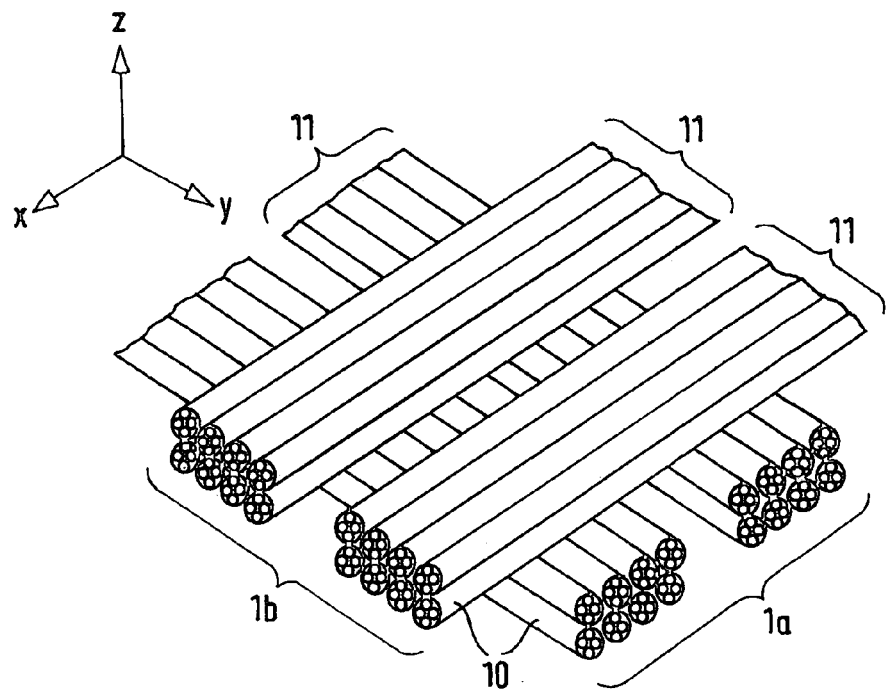
FIG. 1a shows a fibrous structure with layers of fibers which extend in two directions in space.
Figure 1B:
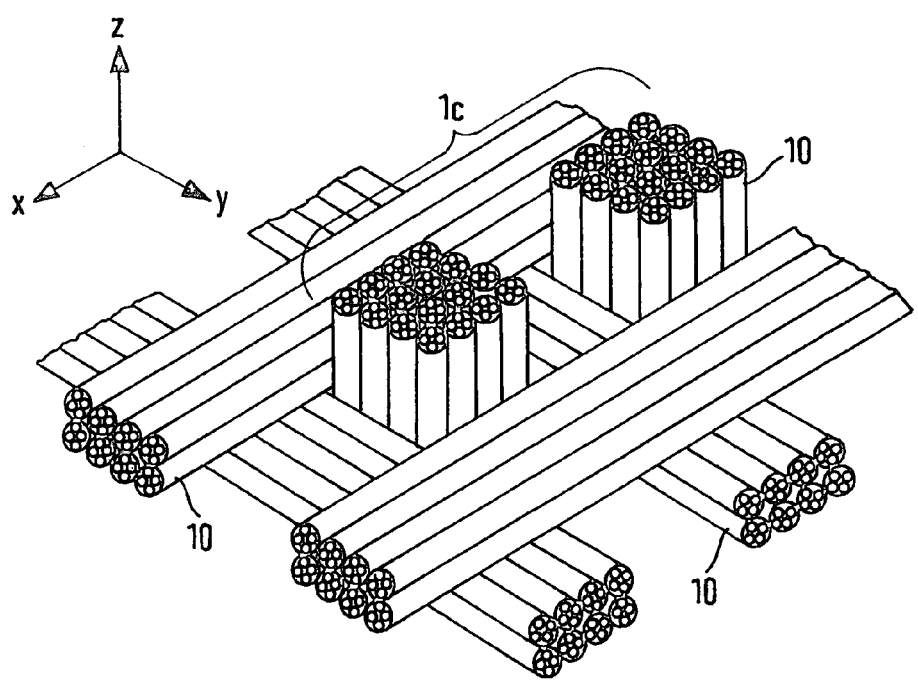
FIG. 1b shows the fibrous structure of FIG. 1a, interwoven with an additional layer of fibers.

With the aid of textile methods, such as interweaving or sewing, a fibrous structure is produced in the form of a three-dimensional matrix made of carbon fibers and then infiltrated with silicon, forming a silicon carbide-containing composite material. FIGS. 1a and 1b depict a corresponding fibrous structure. They show several layers 1a, 1b, 1c of fibers or bundles of fibers 10, wherein the fibers or bundles of fibers of the layer 1a extend in the y direction, those of layer 1b extend in the x direction, and those of the layer 1c extend in the z direction. Thus, the individual layers and/or the fibers or the bundles of fibers 10 of the individual layers extend in different directions in space. In addition, several fibers or bundles of fibers 10 are combined to form larger bundles 11, wherein these larger bundles 11 of a layer 1a, 1b, 1c are spaced apart. The amount of spacing is chosen in such a manner that at least one larger bundle 11 of another layer 1a, 1b, 1c can penetrate at this point the respective layer 1a, 1b, 1c. In this manner, the individual layers 1a, 1b, 1c are interwoven. This situation is depicted in FIG. 1b. As an alternative or in addition, the individual layers 1a, 1b, 1c, or the individual fibers or bundles of fibers 10, or the larger bundles 11, can be sewn together.

The provision of layers 1a, 1b, 1c, whose fibers or bundles of fibers 10 extend in three directions in space x, y, z, results in a defined, three-dimensional fiber matrix, which guarantees that the subsequent composite material is stable against shear forces, generated, for example, by thrust loads in rocket drives. A two-dimensional fibrous structure does not exhibit this strength. Rather, high shear forces can result in interlaminar failure in a two-dimensional fibrous structure. Thus, one significant advantage of the defined three-dimensional fibrous structure lies in increased tolerance. In addition, with the introduction of special types of fibers and special matrix systems, the mechanical and physical properties of the subsequent composite material, such as thermal conductivity and expansion coefficient, can be adjusted as desired.

An example of combustion chamber structure cooled by transpiration is shown in FIG. 2a. In such a structure and at a selected porosity, for example, at a porosity ranging from 10% to 30%, such as approximately 20%, the three-dimensional fibrous structure guarantees adequate bonding strength or damage tolerance, as compared to the two-dimensional construction, particularly for components with stresses in several directions in space.

Cooling channels 5a can be placed in the combustion chamber structure. Cooling channels 5a may be especially useful in rocket drive applications. Cooling channels 5a can be placed either with the used contracting bodies, which dissolve or decompose in the process, for example, plastics or wax, also referred to as lost cores because they can be dissolved out thermally by melting or pyrolysis. The contracting bodies are placed in the fibrous structure prior to fabrication of the composite material or they are placed in the channels of the composite material. Then the channels are closed with a cover layer. However, the channels 5a can also be worked mechanically into the finished composite material, for example, by milling. Channels 5a can also be manufactured by in-situ manufacture via textile technology, for example, by interweaving with simultaneous release of the corresponding channel-shaped openings.

The result of placing special intermediate materials in the form of an intermediate layer 7a between the ceramic combustion chamber composite layer as the internal jacket 4a and a metal, load-bearing external structure as the external jacket 8a is that any stresses in the connecting zone (metal/ceramic) can be reduced to a subcritical amount. In this respect the intermediate layer 7a is designed in such a manner that it exhibits a defined expansion coefficient between that of the material of the internal jacket 4a and that of the external jacket 8a (graduated construction). For example, a metal matrix composite (MMC), a composite material with a metal matrix, can be used as the intermediate material. This intermediate material can be produced, for example, by affixing a fibrous structure made of carbon-containing fibers on the internal jacket. The fibrous structure may be made of silicon carbide or carbon, in the form of a matrix, which, like that of the internal jacket, can be interwoven or braided, or as a fleece or wound fibers, which can be long or short. This fibrous structure can then be infiltrated with a metal material, like nickel, copper, or an alloy with nickel and/or copper in accordance with an electroplating process, wherein at the same time an electroplated layer for forming the external jacket 8a is produced on the fibrous structure. Exclusively carbon-containing particles can also be used to form the MMC. The MMC can also be produced by way of the methods known in the art. Then the metal external structure 8a can be affixed, for example, by soldering, such as active soldering, or electroplating technology.

Many variants for manufacturing combustion chambers according to the present invention exist, certain methods are described in detail below.

EXAMPLE 1

A Drive with Regenerative Cooling

This example may be best understood by referring to FIGS. 2a and 2b. First, the manufacture of the two-dimensional layer construction 1a, 1b is accomplished by winding, prepare, or weaving technology from fibers or bundles of fibers 10. The third fiber layer 1c is incorporated by textile technology, such as tufting, sewing, and weaving. The structure may optionally be hardened for shape stability in the carbon fiber reinforced plastic state. Segmentation (slots) 3a of the combustion chamber structure are optionally provided for minimizing stress.

The multiaxial structure is then pyrolyzed/carbonized to form a dense C/SiC or C/C structure 4a by repeated post-infiltration or Si infiltration. Cooling channels 5a are placed by mechanical treatment of the composite material, by textile technology, or by contracting bodies prior to completion of the composite material. The cooling channels are optionally sealed with a metal coating 6a for improved pressure resistance and tightness with respect to the coolant that flows through in the operating state. Cooling channels may optionally be reworded by milling.

Contracting bodies are placed in the structure, as appropriate. For the electroplating variant, the contracting bodies may be placed by electrically conducting wax into the channels 5a. A metal intermediate layer 7a is then affixed. This may be accomplished, for example, by affixing MMC with a defined expansion coefficient (AK) between the material of the internal jacket 4a (ceramic composite) and the external jacket 8a (metal). After affixing the metal intermediate layer, the metal external structure (8a) is affixed, for example, by electroplating or by active soldering technology such as using the material Inconel 718, a nickel-based alloy. Finally, the contracting bodies are dissolved, for example, by melting out the wax.

EXAMPLE 2

A Drive with Transpirative Cooling, Thus with a Porous Combustion Chamber Structure This example may be best understood by reference to FIGS. 2a and 2b. The two-dimensional layer construction 1a, 1b is manufactured by winding, prepare, or weaving technology with simultaneous placement of place-holders (doped precursors) as the contracting bodies. The third fiber layer 1c is incorporated by textile technology such as tufting, sewing, or weaving. The structure may optionally be hardened for shape stability in the carbon fiber reinforced plastic state. Segmentation (slots) 3a of the combustion chamber structure can be optionally provided for minimizing stress.

The multiaxial structure is pyrolyzed/carbonized to form a porous (open pores) C/SiC or C/C structure 4a with pores or micro cracks. At the same time, the place-holders are burned out by pyrolysis, during which the porosity of the structure can be adjusted by manipulating the degree of infiltration, for example, of silicon. Cooling channels 5a may optionally be added by mechanical treatment or by contracting bodies. The contracting bodies can be placed, for example, by electrically conducting wax into the channels for electroplating variants.

A metal intermediate layer 7a may optionally be affixed, for example, MMC with a defined expansion coefficient (AK) may be affixed between the material of the internal jacket 4a (ceramic composite) and the external jacket 8a (metal). The metal external structure 8a is affixed by electroplating, such as with nickel, or by active soldering technology, for example, using the material Inconel 718, a nickel-based alloy. Finally, the contracting bodies are dissolved, for example, by melting out the wax.

EXAMPLE 3

A Drive with Regenerative Cooling

Figure 3:
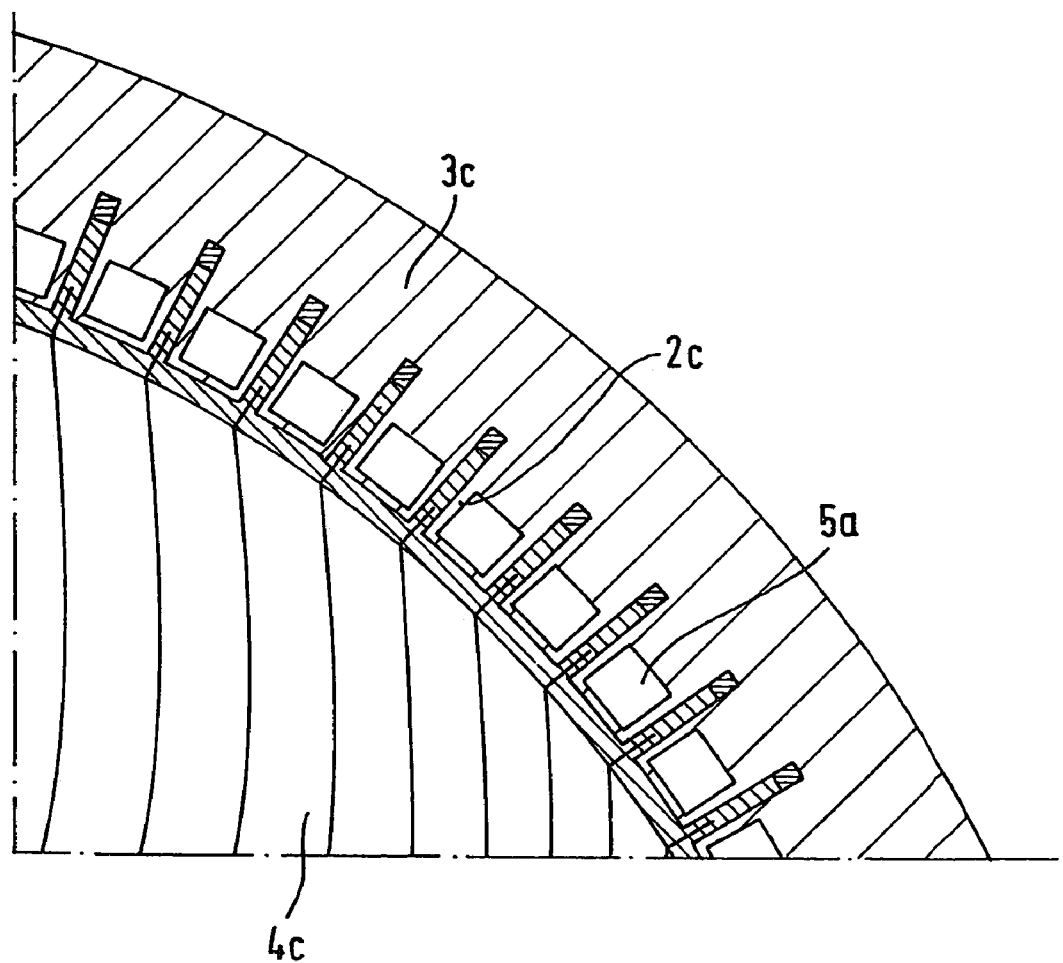
FIG. 3 shows a detailed view of the wall structure of an alternative rocket combustion chamber without intermediate layer but with regenerative cooling.

This example may be best understood by reference to FIG. 3. Individual U-profiles 4c made of a fiber composite ceramic with a defined three-dimensional fibrous structure or Si/SiC analogous are manufactured, such as according to Examples 1 or 2. The U-profiles 4c are bundled/fixed. Optionally, the surface coating 2c may be electroplated, for example, with copper or nickel, at least on the inside of the U-profiles 4c. This provides improved pressure resistance and tightness with respect to the coolant flowing through in the operating state. Then the U-profile coating 2c is optionally reworked and the channel-shaped U-profile structures 5a are filled with contracting bodies, for example, conductive wax. The metal external structure 3c is deposited by electroplating with material such as nickel. Finally, the wax is melted out.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A process for manufacturing a combustion chamber for a rocket drive, comprising:
    producing a fibrous structure comprising layers of carbon-containing fibers which form a three-dimensional matrix;
    producing a ceramic matrix composite material by feeding silicon into said fibrous structure to form a silicon carbide matrix; and
    making at least one composite material jacket of said combustion chamber from said composite material; wherein,
    said producing step comprises forming first, second and third layers of fibers or bundles of fibers, wherein fibers of said first layer extend in a first direction in space; fibers of said second layer extend in a second direction in space; and fibers of said third layer extend in a third direction in space; and wherein said first, second, and third layers penetrate each other at least partially; and
    said forming of first, second and third layers includes separating said fibers or bundles of fibers of the respective layers from each other such that in each layer, fibers or bundles of fibers of another layer can be disposed in resulting spaces.

2. A process according to claim 1, wherein said first, second and third layers of said fibrous structure are connected together by means of textile technology.

3. A process according to claim 2, wherein said first, second, and third layers are connected together by a technique selected from the group consisting of weaving and sewing.

4. A process according to claim 1, further comprising forming channel-shaped spaces in at least one of on the surface of the fibrous structure and in the fibrous structure.

5. A process according to claim 4, wherein said channel-shaped spaces are formed in the surface of the composite material by mechanical treatment.

6. A process according to claim 4, further comprising applying a metal coating at least to surface areas of the composite material that have said channel-shaped spaces.

7. A process according to claim 5, further comprising applying a metal coating at least to the surface areas of the composite material that have said channel-shaped spaces.

8. A process according to claim 1, further comprising arranging channel-shaped contracting bodies on at least one of on the surface of said fibrous structure and in said fibrous structure.

9. A process for manufacturing a combustion chamber for a rocket drive, comprising:
    producing a fibrous structure comprising layers of carbon-containing fibers which form a three-dimensional matrix, said three-dimensional matrix having first, second and third layers of fibers, wherein fibers of said first layer extend in a first direction in space; fibers of said second layer extend in a second direction in space; and fibers of said third layer extend in a third direction in space;
    producing a ceramic matrix composite material by feeding silicon into said fibrous structure to form a silicon carbide matrix;
    making at least one composite material jacket from said ceramic matrix composite material;
    affixing a load-bearing external jacket on said composite material jacket; and providing an intermediate layer between said external jacket and said composite material jacket, wherein a thermal expansion coefficient of said intermediate layer is between thermal expansion coefficients of said external jacket and of said composite material jacket.

10. A process according to claim 9, wherein:
said external jacket comprises a metal material;
said intermediate layer comprises a composite material with a metal matrix;
said intermediate layer is affixed on said composite material jacket; and
said external jacket is affixed on said intermediate layer.

11. A process according to claim 9, wherein said providing step comprises:
first affixing a fibrous structure on said composite material jacket; and
thereafter depositing a metal material on said fibrous structure with simultaneous infiltration of said fibrous structure with said metal material.

12. A process according to claim 10, wherein said metal material is deposited by means of electroplating.

13. A process for manufacturing an intermediate layer between an internal jacket and an external jacket of a combustion chamber for a rocket drive, comprising:
affixing a fibrous structure made of carbon-containing fibers on the internal jacket; and
depositing a metal material on said fibrous structure with simultaneous infiltration of the fibrous structure with said metal material;
wherein at least one part of the internal jacket or the external jacket is made of a composite material with fibrous structure of carbon-containing fibers.

14. A process according to claim 13, wherein said metal material is deposited by means of electroplating.

15. The process according to claim 13, wherein
said depositing step includes formation of said external jacket, substantially simultaneously with infiltration of the fibrous structure with said metal material.

16. The process according to claim 10, wherein said providing step comprises forming said metal matrix using the same metal material contained in said external jacket.

* * * * *